(12) United States Patent
Kumar et al.

(10) Patent No.: US 8,571,332 B2
(45) Date of Patent: Oct. 29, 2013

(54) METHODS, SYSTEMS, AND MEDIA FOR AUTOMATICALLY CLASSIFYING FACE IMAGES (75) Inventors: Neeraj Kumar, New York, NY (US); Peter N Belhumeur, New York, NY (US); Shree K Nayar, New York, NY (US); Alexander C Berg, Stony Brook, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 231 days.

(21) Appl. No.: 12/933,639

(22) PCT Filed: Mar. 19, 2009

(86) PCT No.: PCT/US2009/037710
§ 371 (c)(1),
(2), (4) Date: Sep. 20, 2010

(87) PCT Pub. No.: WO2009/117607
PCT Pub. Date: Sep. 24, 2009

(65) Prior Publication Data
US 2011/0243461 A1 Oct. 6, 2011

Related U.S. Application Data

(60) Provisional application No. 61/037,927, filed on Mar. 19, 2008.

(51) Int. Cl.
*G06K 9/60* (2006.01)
*G06K 9/00* (2006.01)

(52) U.S. Cl.
USPC .......................................... 382/224; 382/118

(58) Field of Classification Search
USPC .................................. 382/103, 118, 224, 225
See application file for complete search history.

(56) References Cited

U.S. PATENT DOCUMENTS 5,781,650 A * 7/1998 Lobo et al. .................... 382/118
6,236,749 B1 5/2001 Satonaka et al.
7,024,033 B2 4/2006 Li et al.

(Continued)

OTHER PUBLICATIONS

Aleksic, P.S., and Katsaggelos, A.K., "Automatic Facial Expression Recognition Using Facial Animation Parameters and Multistream HMMs", in IEEE Transactions on Information Forensics and Security, vol. 1, No. 1, Mar. 2006, pp. 3-11.

(Continued)

*Primary Examiner* — Daniel Mariam
(74) *Attorney, Agent, or Firm* — Bryne Poh LLP (57) ABSTRACT

Methods, systems, and media for automatically classifying face images are provided. In some embodiments, features of the face image to be classified for an attribute are selected, wherein each of the features corresponds to a different region of the face image and specifies one or more of a type of pixel data to be evaluated for the region, a normalization to be applied for the region, and an aggregation to be applied for the region. The face image is classified with respect to the attribute based on the features of the image, and the attribute and a confidence value are assigned to the face image based on the classifying. A query is received from a user, and the attribute is identified as corresponding to the query. The face image is determined as corresponding to the attribute, and the face image is identified to the user as corresponding to the query.

21 Claims, 11 Drawing Sheets

(56) References Cited

U.S. PATENT DOCUMENTS

| | | | |
|---|---|---|---|
| 7,043,056 B2 | 5/2006 | Edwards et al. | |
| 7,212,233 B2 | 5/2007 | Nakamura | |
| 7,215,793 B2 | 5/2007 | Takahashi | |
| 7,711,145 B2 | 5/2010 | Gallagher | |
| 7,760,917 B2 * | 7/2010 | Vanhoucke et al. | 382/115 |
| 7,921,036 B1 * | 4/2011 | Sharma et al. | 705/14.66 |
| 8,024,189 B2 | 9/2011 | Zhang et al. | |

OTHER PUBLICATIONS

Baluja, S., and Rowley, H.A., "Boosting Sex Identification Performance", in International Journal of Computer Vision, vol. 71, No. 1, 2007, pp. 111-119.

Bartlett, M.S., et al., "Real Time Face Detection and Facial Expression Recognition: Development and Applications to Human Computer Interaction", in Conference on Computer Vision and Pattern Recognition Workshop, (CVPRW '03), vol. 5, Jun. 16-22, 2003.

Belhumeur, P.N., et al., "Eigenfaces vs. Fisherfaces: Recognition Using Class Specific Linear Projection", in 1996 European Conference on Computer Vision (ECCV '96), Lecture Notes in Computer Science, vol. 1064, 1996, pp. 45-58.

Chang, C.C. and Lin, C.J., "LIBSVM: A Library for Support Vector Machine", 2001, Software available at: http://www.csie.ntu.edu.tw/~cjlin/libsvm/.

Cortes, C. and Vapnik, V., "Support-Vector Networks", in Machine Learning, vol. 20, No. 3, 1995, pp. 273-297.

Cottrell, G.W. and Metcalfe, J., "Empath: Face, Emotion, and Gender Recognition Using Holons", In Proceedings of the 1990 Conference on Advances in Neural Information Processing Systems (NIPS-3), 1990, pp. 564-571.

Datta, R., et al., "Content-Based Image Retrieval: Approaches and Trends of the New Age", In Proceedings of the 7th ACM SIGMM International Workshop on Multimedia Information Retrieval (MIR '05), Singapore, Nov. 11-12, 2005, pp. 253-262.

Drucker, H. and Cortes, C., "Boosting Decision Trees", In Advances in Neural Information Processing Systems (NIPS), Nov. 27-30, 1995, pp. 479-485.

Freund, Y. and Schapire, R.E., "Experiments with a New Boosting Algorithm", In Proceedings of the Thirteenth International Conference on Machine Learning, 1996, pp. 148-156.

Georghiades, a.S., et al., "From Few to Many: Illumination Cone Models for Face Recognition Under Variable Lighting and Pose", In IEEE Transactions on Pattern Analysis and Machine Intelligence, vol. 23, No. 6, Jun. 2001, pp. 643-660.

Golomb, B.A., "Sexnet: A Neural Network Identifies Sex from Human Faces", In Proceedings of the 1990 Conference on Advances in Neural Information Processing Systems 3 (NIPS-3), 1990, pp. 572-577.

Huang, J., et al., "Face Pose Discrimination Using Support Vector Machines (SVM)", In Proceedings of the Fourteenth International Conference on Pattern Recognition (ICPR '98), vol. 1, Aug. 16-20, 1998, pp. 154-156.

International Preliminary Report on Patentability in International Patent Application No. PCT/US2009/037710, filed Mar. 19, 2009, mailed Sep. 30, 2010.

International Search Report in International Patent Application No. PCT/US2009/037710, filed Mar. 19, 2009, mailed Jun. 17, 2009.

Jabon, M., et al., "Facing the Truth: Using Color to Improve Facial Feature Extraction", Technical Report, Mar. 20, 2008, available at: http://scien.stanford.edu/pp./labsite/2008/psych221/projects/08/MariaJabon/index.htm.

Jiang, W., et al., "Multiple Boosting SVM Active Learning for Image Retrieval", In Proceedings of IEEE International Conference on Acoustics, Speech, and Signal Processing (ICASSP '04), vol. 3, May 17-21, 2004, pp. III-421-424.

Moghaddam, B., and Yang, M.H., "Learning Gender with Support Faces", In IEEE Transactions on Pattern Analysis and Machine Intelligence, vol. 24, No. 7, Jul. 2002.

Osuna, E., et al., "Training Support Vector Machine: An Application to Face Detection", In Proceedings of IEEE Computer Society Conference on Computer Vision and Pattern Recognition, Jun. 17-19, 1997, pp. 130-136.

Pentland, A., et al., "Photobook: Content-Based Manipulation of Image Databases", In International Journal of Computer Vision, vol. 18, No. 3, 1996, pp. 233-254.

Pentland, A., et al., "View-Based and Modular Eigenspaces for Face Recognition", In Proceedings of IEEE Computer Society Conference on Computer Vision and Pattern Recognition (CVPR '94), Jun. 21-23, 1994.

Phillips, P.J., et al., "Overview of the Face Recognition Grand Challenge", In the Proceedings of the 2005 IEEE Computer Society Conference on Computer Vision and Pattern Recognition (CVPR'05), vol. 1, Jun. 20-25, 2005, pp. 947-954.

Phillips, P.J., et al., "The Feret Evaluation Methodology for Face-Recognition Algorithms", In IEEE Transactions on Pattern Analysis and Machine Intelligence, vol. 22, No. 10, Oct. 2000, pp. 1090-1104.

Pink Tentacle, "OKAO Vision: Real-Time Smile Analysis", Sep. 7, 2007, available at: http://pinktentacle.com/2007/09/okao-vision-real-time-smile-analysis/.

Schapire, R.E., et al., "Boosting the Margin: A New Explanation for the Effectiveness of Voting Methods", In the Annals of Statistics, vol. 26, No. 5, May 7, 1998, pp. 1651-1686.

Shakhnarovich, G., et al., "A Unified Learning Framework for Real Time Face Detection and Classification", In Proceedings of the Fifth IEEE International Conference on Automatic Face and Gesture Recognition (FGR'02), May 20-21, 2002, pp. 14-21.

Sim, T., et al, "The CMU Pose, Illumination, and Expression (PIE) Database", In Proceedings of the Fifth IEEE International Conference on Automatic Face and Gesture Recognition (FGR'02), May 20-21, 2002.

Viola, P. and Jones, M., "Rapid Object Detection Using a Boosted Cascade of Simple Features", In Proceedings of the IEEE Conference on Computer Vision and Pattern Recognition (CVPR 2001), vol. 1, 2001.

Wang, Y., et al., "Real Time Facial Expression Recognition with Adaboost", In Proceedings of the 17th International Conference on Pattern Recognition (ICPR 2004), vol. 3, Aug. 23-26, 2004, pp. 926-929.

Written Opinion in International Patent Application No. PCT/US2009/037710, filed Mar. 19, 2009, mailed Jun. 17, 2009.

Zhang, L., et al., "Imlooking: Image-Based Face Retrieval in Online Dating Profile Search", In CHI '06 Extended Abstracts on Human Factors in Computing Systems, Montreal, Quebec, Canada, Apr. 22-27, 2006, (CHI EA '06), pp. 1577-1582.

* cited by examiner

FIG. 11

METHODS, SYSTEMS, AND MEDIA FOR AUTOMATICALLY CLASSIFYING FACE IMAGES

CROSS REFERENCE TO RELATED APPLICATION

This application claims the benefit of U.S. Provisional Patent Application No. 61/037,927, filed Mar. 19, 2008, which is hereby incorporated by reference herein in its entirety.

STATEMENT RETARDING FEDERALLY FUNDED RESEARCH

This invention was made with government support under MURI Grant Contract No. N00014-1-08-0638 awarded by the Office of Naval Research. The government has certain rights in the invention.

TECHNICAL FIELD

The disclosed subject matter relates to methods, systems, and media for automatically classifying face images.

BACKGROUND

Due to the prevalence of digital cameras in modern society, and the ease with which such images can be distributed and shared through media such as the Internet, there is an extremely large and ever growing collection of images containing faces available for consumption by the public. Moreover, private collections of images containing faces are also being compiled at ever increasing rates as the number of devices capable of collecting such images that are owned and used by individuals continues to increase.

However, the ability to search these public and private collections of images containing faces has been limited due to a lack of classification of the images. While some images have been classified to describe what is contained in the faces in such images, prior classification attempts have been inadequate. For example, manual classification of images is time consuming and thus expensive, prior automatic classification has been frequently inaccurate because it tends to rely on text surrounding an image for classification, not on the image itself, and the remaining images (which constitutes the vast majority of images) are simply not classified at all.

SUMMARY

In accordance with various embodiments, methods, systems, and media for automatically classifying face images are provided. In some embodiments, features of the face image to be classified for an attribute are selected, wherein each of the features corresponds to a different region of the face image and specifies one or more of a type of pixel data to be evaluated for the region, a normalization to be applied for the region, and an aggregation to be applied for the region. The face image is then classified with respect to the attribute based on the features of the image, and the attribute and a confidence value are assigned to the face image based on the classifying. A query is next received from a user, and the attribute is identified as corresponding to the query. The face image is then determined as corresponding to the attribute, and the face image is identified to the user as corresponding to the query.

DETAILED DESCRIPTION

In accordance with various embodiments, methods, systems, and media for automatically classifying face images are provided. These mechanisms can be used in a variety of applications. For example, in some embodiments, these mechanisms can be used to automatically assign attributes to images and the faces shown therein so that the images can be more easily searched. As a more particular example, in some embodiments, a collection of faces can be automatically processed to determine which images contain faces of men, which images contain faces that are smiling, which images were taken with a bright flash, which images contain faces with black hair, etc. Such mechanisms can be useful for law enforcement, social networking, personal photograph management, and many other applications to enable a person to find pictures of people of interest by entering attributes of the people and automatically searching classified photographs.

Figure 1:
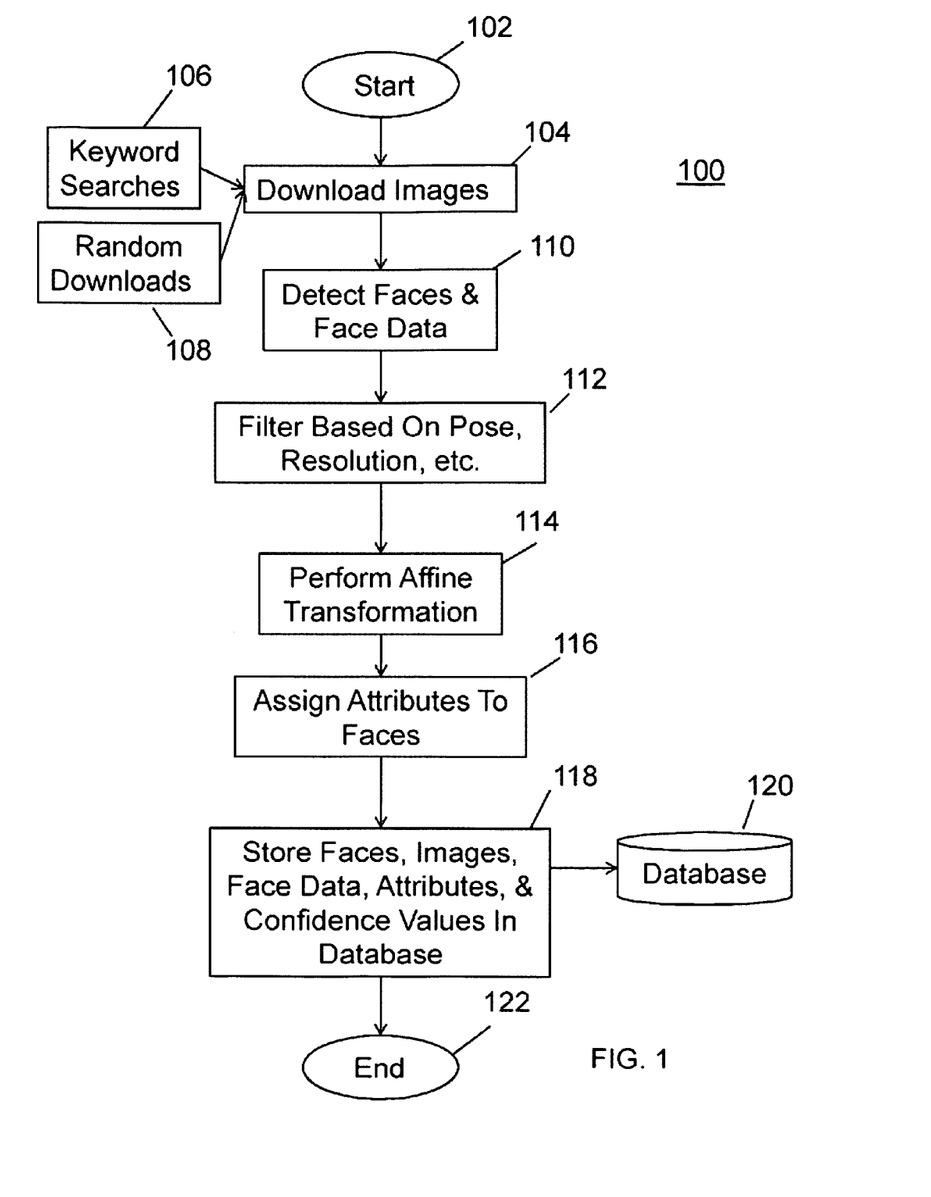
FIG. 1 is a diagram of a process for automatically classifying face images in accordance with some embodiments.

Turning to FIG. 1, a process 100 for creating a classified library of face images in accordance with some embodiments is illustrated. As shown, after process 100 begins at 102, images can be downloaded at 104. These images can be downloaded from any suitable source. For example, the images can be downloaded from image search engines, such as GOOGLE (http://images.google.com), using keyword searches at 106, images can be downloaded from random downloads from image sharing sites, such as PICASA (http://www.picasa.com), at 108, images can be downloaded from a private library of images (e.g., stored on a media device), etc.

Figure 8:
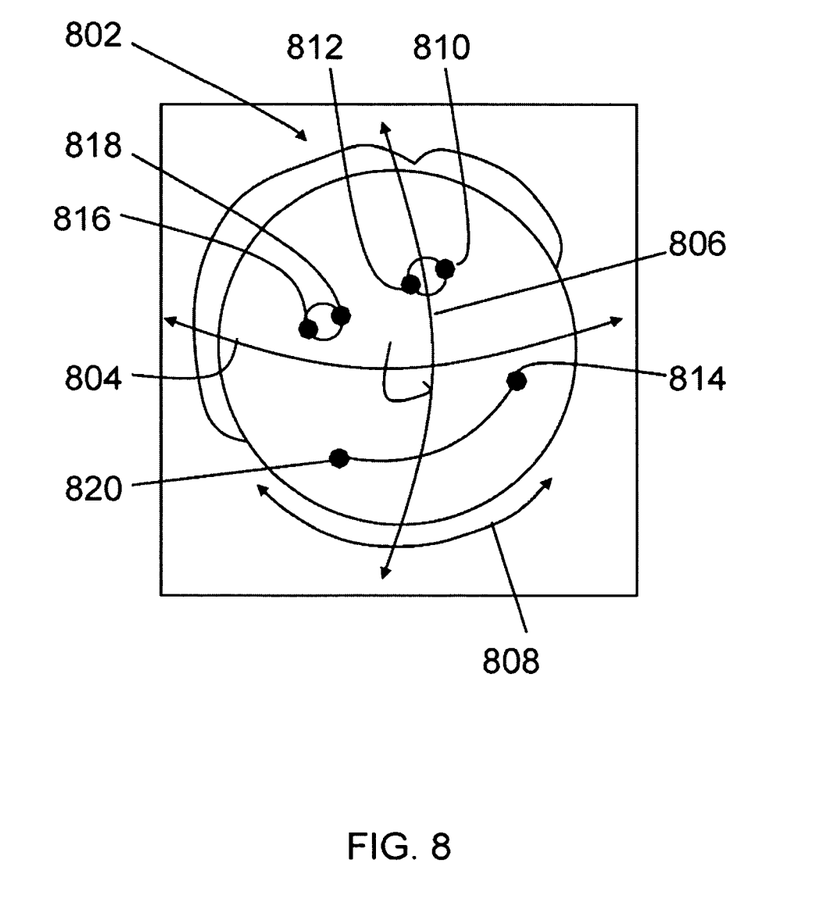
FIG. 8 is a diagram of a detected face showing pose angles and fiducial points in accordance with some embodiments.

Next at 110, a face detector can be used to detect faces in the images and determine face data, such as the pose information of the faces, fiducial points, and any other suitable data relating to the faces. Any suitable face detector can be used. For example, the OKAO VISION face detector from OMRON CORPORATION of Kyoto, Japan, can be used in some embodiments. As shown in FIG. 8, the face detector can provide pose information that indicates the yaw 804, pitch 806, and roll 808 of the detected face. As also shown in FIG. 8, this mechanism can provide data that indicates six (or any suitable number of) fiducial points 810, 812, 814, 816, 818, and 820. As illustrated; these fiducial points can identify the locations of the inside and outside corners of each eye and the corners of the mouth in the detected face.

The faces detected can then be filtered based on pose information, resolution, etc. at 112. For example, in some embodiments, only faces with yaw and pitch angles within ten degrees of center can be used. As another example, in some embodiments, faces below a minimum resolution can be filtered out.

At 114, an affine transformation can be applied to the faces in order to align them to a canonical pose. More particularly, this alignment can be effected by estimating an affine transformation between the fiducial points of the detected face and the fiducial points of the canonical pose, and then applying that affine transformation to the detected face. Any suitable canonical pose can be used. For example, the canonical pose can define the size of the face, the pose angles, etc.

Attributes can next be automatically assigned to the faces at 116. Any suitable attributes can be used in some embodiments. For example, attributes can define the gender of the face as male or female, attributes can define the age of the face as baby, child, youth, middle aged, senior, etc., attributes can define the hair color of the face as black, blond, etc., attributes can define whether the face is smiling or not, attributes can define whether the face has a mustache or not, attributes can define whether the face is blurry, attributes can define lighting conditions on the face as flash, harsh, dark, etc., attributes can define the race of the face as white, black, asian, etc., attributes can define eyewear on the face as none, eyeglasses, sunglasses, etc., and attributes can define whether the face was photographed outdoor, indoor, etc.

Once attributes have been assigned, the faces, the original images containing those faces, the face data, the attributes, and confidence values for the attributes can be stored in a database 120 at 118. Any suitable database 120 can be used. After these items have been stored, process 100 can terminate at 122.

Figure 2:
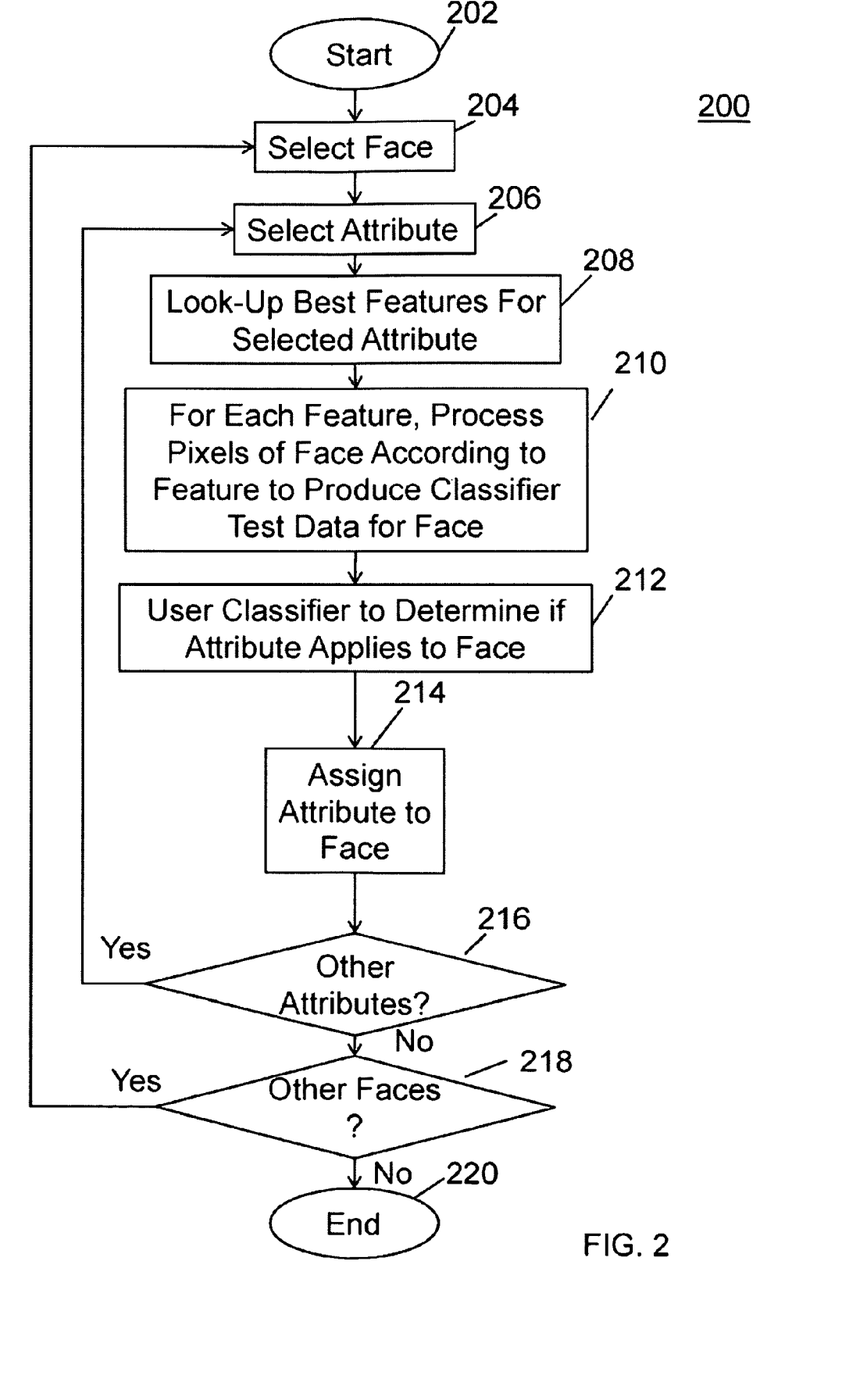
FIG. 2 is a diagram of a process for assigning attributes to faces in accordance with some embodiments.

FIG. 200 illustrates an example of a process 200 for automatically assigning attributes to faces that can be used at 116 in accordance with some embodiments. After process 200 begins at 202, the process can first select a face to which attributes are to be assigned at 204 and then select an attribute against which the face is to be classified at 206. For example, the process can select the first face and determine whether the face is that of a male.

Figure 9:
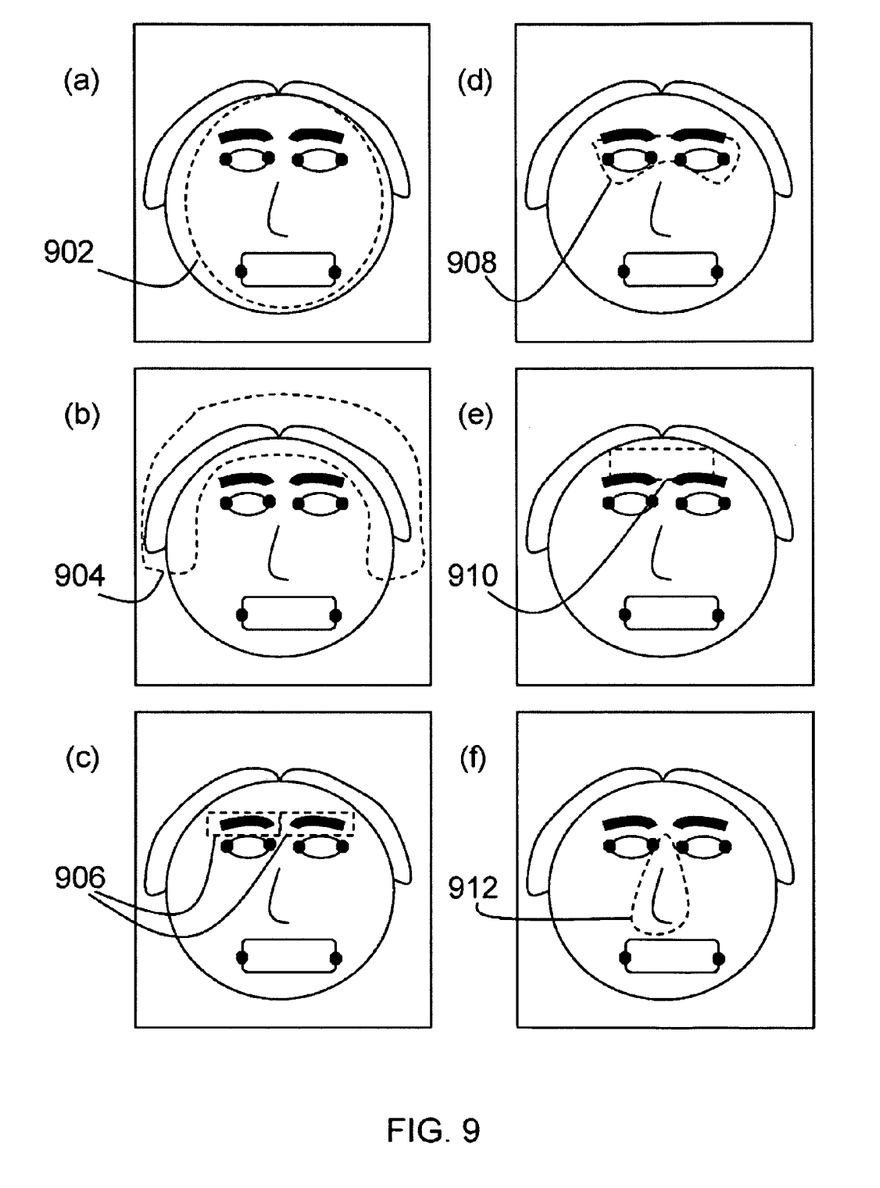
FIGS. 9 and 10 are diagrams of feature regions of a face in accordance with some embodiments.
Figure 10:
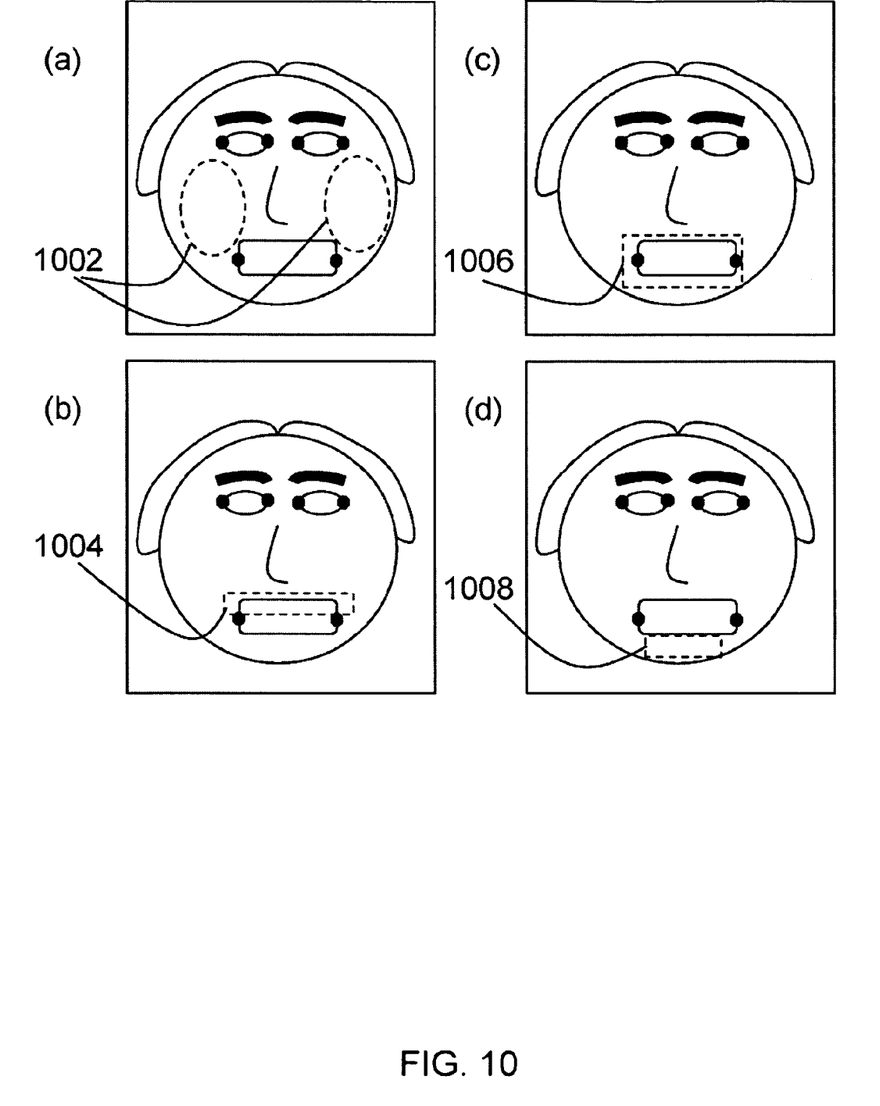

Next, at 208, process 200 can look-up which feature(s) are the best for identifying the selected attribute. Any suitable feature(s) for identifying the attribute can be used, and which feature(s) are best can be determined for each attribute in advance, as described below in connection with FIG. 4. For example, as illustrated in the table below, a feature of a face can define the region of the face, the type of pixel data to look at, a normalization to be applied to the pixels, any aggregation of pixels in the region to be applied, and any other suitable data or processes. As shown, the regions can include the whole face, the hair, the forehead, the eyebrows, the eyes, the nose, the cheeks, the upper lip, the mouth, the chin, etc. Examples of these regions are illustrated in FIGS. 9 and 10 as whole face 902 in FIG. 9(*a*), hair 904 in FIG. 9(*b*), eyebrows 906 in FIG. 9(*c*), eyes 908 in FIG. 9(*d*), forehead 910 in FIG. 9(*e*), nose 912 in FIG. 9(*f*), cheeks 1002 in FIG. 10(*a*), upper lip 1004 in FIG. 10(*b*), mouth 1006 in FIG. 10(*c*), and chin 1008 in FIG. 10(*d*). In some embodiments, these regions can be sized large enough to be robust against small differences in faces and can overlap each other to prevent alignment problems. The type of pixel data can include RGB data, HSV data, image intensity data, edge magnitude data, edge orientation data, etc. The normalization can include no normalization, mean normalization, energy normalization, etc. The mean normalized value ($\hat{x}$) of a pixel can be used to remove illumination gains in a face and can be defined as:

$$\hat{x} = \frac{x}{\mu},$$

where x is the original value of the pixel and $\mu$ is the mean value of pixels in the region. The energy normalized value ($\hat{x}$) of a pixel can be used to remove gains and offset in the face and can be defined as:

$$\hat{x} = \frac{x - \mu}{\sigma},$$

where x is the original value of the pixel, $\mu$ is the mean value of pixels in the region, and $\sigma$ is the standard deviation of pixels in the region. The aggregation can include no aggregation, a histogram of values, mean and variance statistics, etc. As can be seen, just using these examples of feature options, there can be 450 different features.

TABLE

| Region | Type of Pixel Data | Normalization | Aggregation |
| --- | --- | --- | --- |
| Whole face | RGB | None | None |
| Hair | HSV | Mean Normalization | Histogram of Values |
| Forehead | Image Intensity | Energy Normalization | Mean & Variance Statistics |
| Eyebrows | Edge Magnitude | | |
| Eyes | Edge Orientation | | |
| Nose | | | |
| Cheeks | | | |
| Upper Lip | | | |
| Mouth | | | |
| Chin | | | |

For each of the feature(s), the pixels of the face can be processed according to the feature at 210 as described below in connection with FIG. 3. Next, at 212, a classifier, such as, for example, a support vector machine (SVM), can be used to classify the face with respect to the attribute. Any suitable classifier can be used in some embodiments. The attribute (e.g., "gender=male" or "gender=not male") and its confidence value can then be assigned to the face at 214. After assigning the attribute, process 200 determines at 216 if there are other attributes to check against the face. If there are other attributes, process 200 loops back to 206 and selects the next attribute. Otherwise, process 200 determines at 218 if there are other faces to assign attributes to if there are other faces, process 200 loops back to 204 and selects the next face. Otherwise, process 200 terminates at 220.

Figure 3:
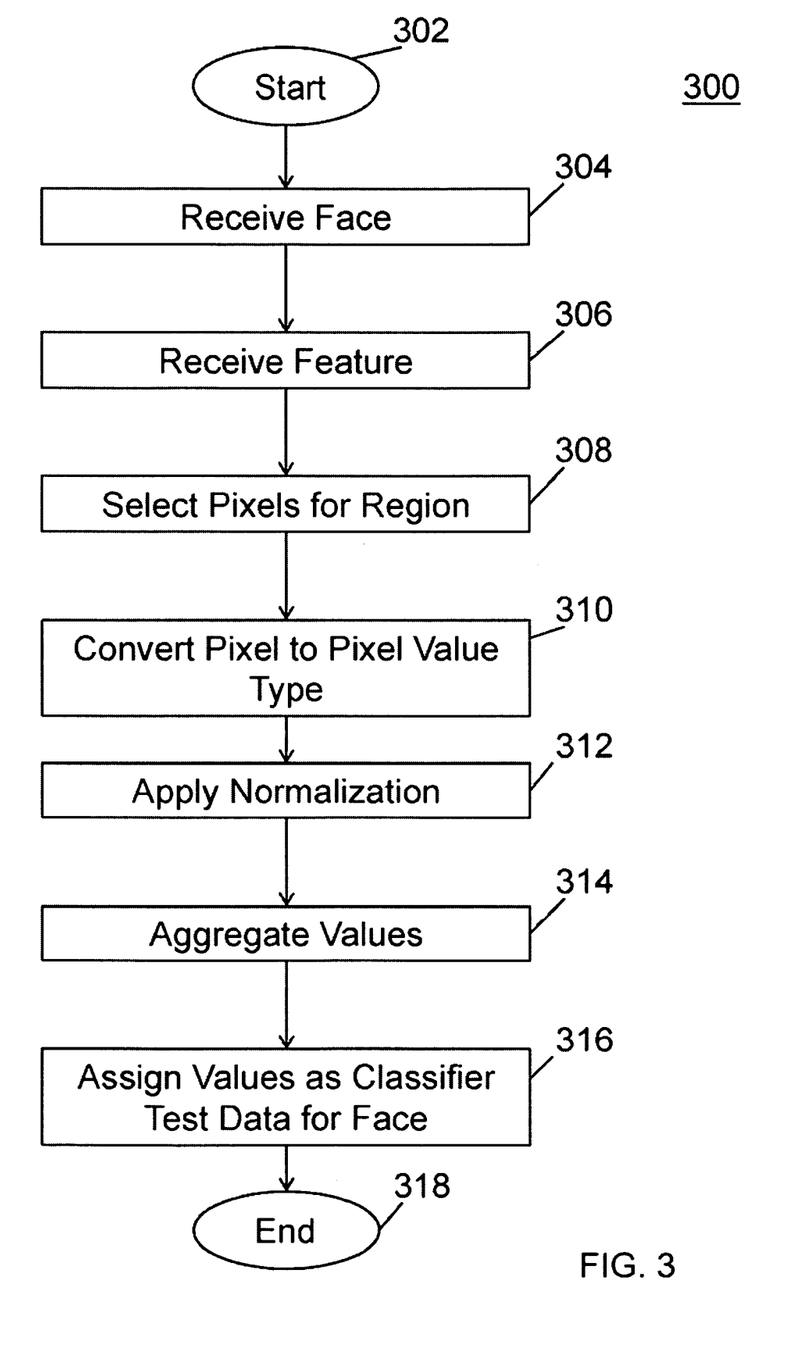
FIG. 3 is a diagram of a process for processing pixels for a feature of a face in accordance with some embodiments.

Turning to FIG. 3, an example of a process 300 for processing the pixels of a face according to a feature at 210 is illustrated. As shown, after process 300 begins at 302, the process receives a face at 304 and receives a feature for the face at 306. Pixels in the face corresponding to a region specified in the feature are next selected at 308. These pixels can be selected using any suitable mechanism. For example, a mask can be defined for each region and combination of pose angles, and the mask can be used to select corresponding pixels from a face for that region and combination of pose angles. As another example, a three-dimensional model of a head can be defined with regions specified therein, this model used to project a mask into two dimensions based on the pose angles, and then the mask used to select pixels.

Next, at 310, the selected pixels are converted to the pixel value type specified for the feature. For example, the pixels can be converted to the HSV color space if the HSV color space is specified for the feature. Once the pixels have been converted, normalization can be applied to the pixels as defined by the feature at 312. For example, mean normalization or energy normalization can be applied (as described above) to remove illumination effects from the pixels. At 314, the values of the pixels can be aggregated as defined in the feature. For example, a histogram of the values can be calculated, or mean and variance statistics of the values calculated. Finally, at 316, the resulting values can be assigned as classifier test data values for the face so that these values can be used to determine whether the face should be classified as having an attribute corresponding to the feature, and then process 300 can be terminated at 318.

Figure 4:
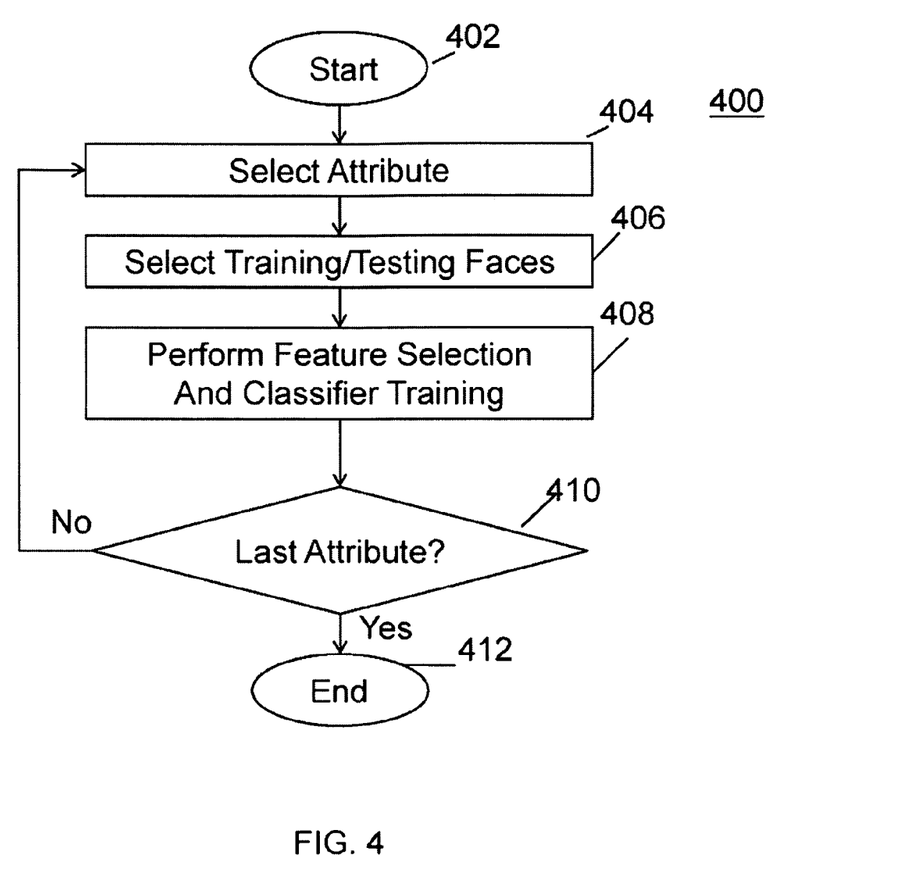
FIG. 4 is a diagram of a process for training classifiers for each of multiple attributes of faces in accordance with some embodiments.

As described above, in some embodiments, one or more features are selected for each attribute and a corresponding classifier trained so that it is able to determine whether a face, when looked at for those features, has the corresponding attribute. An example of a process 400 for selecting the features and training the classifier is illustrated in FIG. 4. As shown, after process 400 begins at 402, an attribute is selected at 404. This attribute can be any suitable attribute, such as the first attribute in a list of all possible attributes being used. Next, at 406, a combination of training/testing faces is selected. This combination can be any suitable combination of testing/training faces for testing and/or training a classifier. For example, from a set of manually classified faces, a sub-set of 80% of these faces can be selected as a training set and a sub-set of the remaining 20% of these faces can be selected as a testing set (e.g., to verify the accuracy of the training). In subsequent iterations of training, different sub-sets of faces of the set can be used for testing and the remaining faces used for training. Any suitable training/testing faces can be used in some embodiments. For example, faces manually classified for each attribute can be used to train and/or test a classifier. In some embodiments, for each attribute, there can be 200 (or any suitable number of) faces having that attribute and an equal or similar number of faces not having that attribute.

Next at 408, features useful for identifying the selected attribute in a face to be classified can be selected and a classifier for the attribute trained. Any suitable approach to perform feature selection and classifier training can be used in some embodiments.

Figure 5:
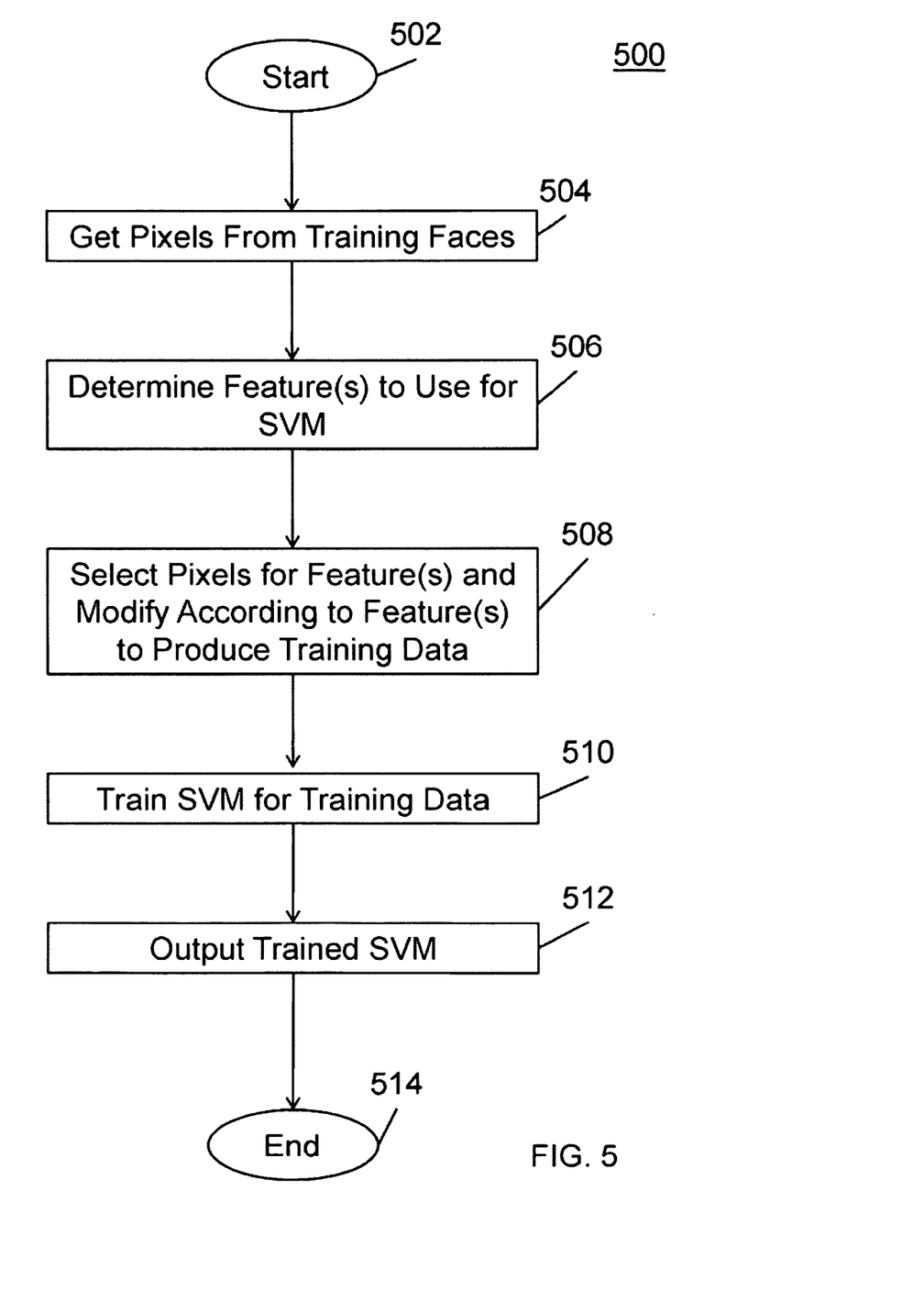
FIG. 5 is a diagram of a process for training a support vector machine in accordance with some embodiments.

For example, in some embodiments, a combination of Support Vector Machines (SVMs) and Adaboost can be used to perform feature selection and classifier training. In doing so, a single-feature Support Vector Machine (SVM) can first be trained for each feature on a portion (e.g., 50%) of the training faces from the combination of training/testing faces. A process for training an SVM is illustrated and described below in connection with FIG. 5. As illustrated above, when there are a large number of features defined (such as the 450 different features illustrated above), a large number of SVMs may need to be trained. Any suitable program for training SVMs can be used. For example, the SVMs can be trained using the LibSVM library from Chang, C. C., Lin, C. J., LIBSVM: A library for support vector machines, 2001, http://www.csie.ntu.edu.tw/cjlin/libsvm (which is hereby incorporated by reference herein in its entirety) in some embodiments.

Adaboost can next be run to determine a ranking of these features with respect to how well they indicate whether the attribute is present in the training faces. Adaboost can be implemented in any suitable fashion, such as that described in Bajula, S., Rowley, H., Boosting sex identification performance, International Journal of Computer Vision, 2007, pp. 111-119 (which is hereby incorporated by reference herein in its entirety) with the modification that errors can be computed in a continuous manner rather than discretely.

For example, in some embodiments, the following process can be performed:
1) First, an empty set of "strong" classifiers is defined, and each of the remaining training faces (e.g., the remaining 50% of the training faces not used to originally train the single-feature SVMs) is initialized to have equal weight. 2) This set of faces can next be classified using the single-feature SVMs not included in the set of "strong" classifiers to determine the weighted accuracy of each remaining single-feature SVM. 3) Next, the single-feature SVM classifier that has the best weighted accuracy and that is not in the set of "strong" classifiers already selected is added to the set of "strong" classifiers along with a weight that depends on the weighted accuracy computed in 2). 4) Each of the training examples is reweighted depending on whether it was correctly classified using the classifier selected in 3). 5) (2) through (4) are then repeated a predetermined number of times (e.g., six). 6) The features corresponding to the single-feature SVM classifiers in the set of classifiers are then identified as the best features for the attribute.

A separate multi-feature SVM can next be trained using the training faces for the highest-ranking features identified by Adaboost and selected for classification of faces (e.g., at 212 of FIG. 2) for the attribute. Any suitable number (such as six) of the highest-ranking features can be used. A process for training an SVM is illustrated and described below in connection with FIG. 5. Alternatively to using a multi-feature SVM for classification of faces (e.g., at 212 of FIG. 2) for the attribute, in some embodiments, the combination of single-feature SVMs identified as being best at classifying the attribute can be used on a weighted basis to determine the classification of faces (e.g., at 212 of FIG. 2) for the attribute. Finally, the classifier selected for classification of faces can be tested using the testing faces of the combination of testing/training faces (e.g., the 20% of the combination of testing/training faces) to determine the classifier's training accuracy.

In some embodiments, alternatively to using a combination of Support Vector Machines (SVMs) and Adaboost to perform feature selection as described above at 408, SVMs without Adaboost can be used as follows: 1) First, an empty set of features is defined.
2) Next, a separate SVM classifier is trained for each of the remaining features not in the set of features using the current set of features and a different one of remaining features, and the training accuracy for each separate SVM noted. 3) The added one of the remaining defined features corresponding to the SVM with the best training accuracy in (2) is then determined and added to the set of features. 4) The training and noting in (2) and the determining and adding in (3) are then repeated in subsequent rounds until the best training accuracy in one round is no better (or not better by some predetermined amount) than the best training accuracy from the previous round, or until some maximum number of rounds (e.g., six) has occurred. (Thus, in the first round of training, each SVM is being trained using one feature; in the second round of training each SVM is being trained using the best feature from the first round plus a different remaining feature; and so on.) 5) The SVM with the best accuracy from the different rounds is then used as the classifier for classifying faces for the current attribute and the features corresponding to that SVM are selected as the best features for that attribute.

Next, at 410, process 400 can determine if the current attribute was the last attribute, and, if not, process 400 can loop back to 404 to select the next attribute. Otherwise, process 400 can terminate at 412.

As mentioned above, FIG. 5 illustrates an example of a process 500 for training an SVM in accordance with some embodiments that can be used at 408 of FIG. 4. As shown, after process 500 begins at 502, the process gets, at 504, pixels from the training faces of the combination of training/testing faces being used. Getting these pixels can be accomplished in any suitable manner. For example, the pixels can be copied from the training faces. Next, at 506, the feature(s) to be used for the SVM can be determined. For a single-feature SVM, a single feature can be determined. For a multi-feature SVM, multiple features can be determined. At 508, the pixels for the feature can next be selected based on the region of the feature and modified according to the feature to produce the training data. This selection and modification can be performed in any suitable manner, such as that described in connection with FIG. 3. Next, an SVM can be trained at 510 using the training data from the output of 508. This trained SVM can then be output at 512, and process 500 terminated at 514.

Figure 6:
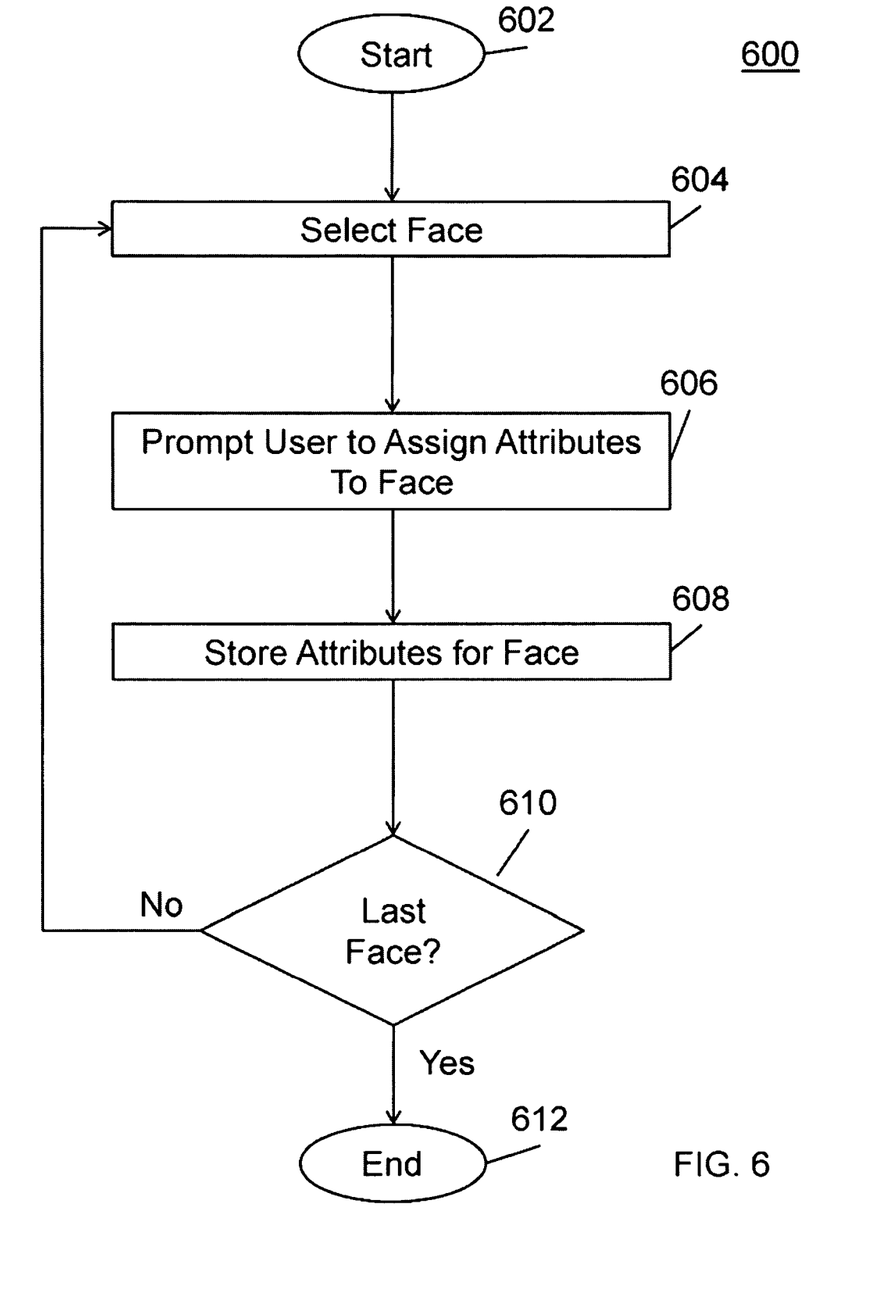
FIG. 6 is a diagram of a process for creating training/testing face sets in accordance with some embodiments.

Training/testing faces can be obtained from any suitable source in accordance with some embodiments. For example, training/testing faces can be obtained by a user manually classifying faces as having certain attributes. An example of a process 600 for manually classifying faces is illustrated in FIG. 6. As shown, after process 600 has begun at 602, the process can select a face to be manually classified at 604. This face can be any suitable face, such as the first face in a random set of faces obtained from an image search on the Internet. At 606, a user can be prompted to assign attributes to the face. The user can be prompted in any suitable manner. For example, the user can be prompted to describe the face and then natural language processing techniques, a thesaurus, and/or a dictionary used to cross reference the user's description to pre-defined attributes. As another example, check boxes for attributes can be presented to the user. As yet another example, drop down menus can be presented to the user.

Next, at 608, the attributes manually entered by the user can be associated with and stored for the face. In some embodiments, certain already-classified faces can be randomly presented to the user for classification (without the user knowing these faces are already classified) along with previously unclassified faces to determine if the user is accurately classifying the faces. If it is determined that the user is not accurately classifying faces, the user's classifications can be ignored and not stored at 608.

Finally, process 600 can determine if there are any more faces to be classified, and, if so, process 600 can loop back to 604 to select the next face. Otherwise, process 600 can terminate at 612.

In some embodiments, manual classification of faces can be performed in a variety of scenarios. For example, a user can be prompted to perform face classification in exchange for gaining access to a service or content offered on the Internet. Such classification may accordingly need to be highly scrutinized using pre-classified test faces to determine if the user is performing accurate classification. As another example, manual classification can be presented in the form of a game. As yet another example, manual classification can be performed as part of a social networking Web site.

Figure 7:
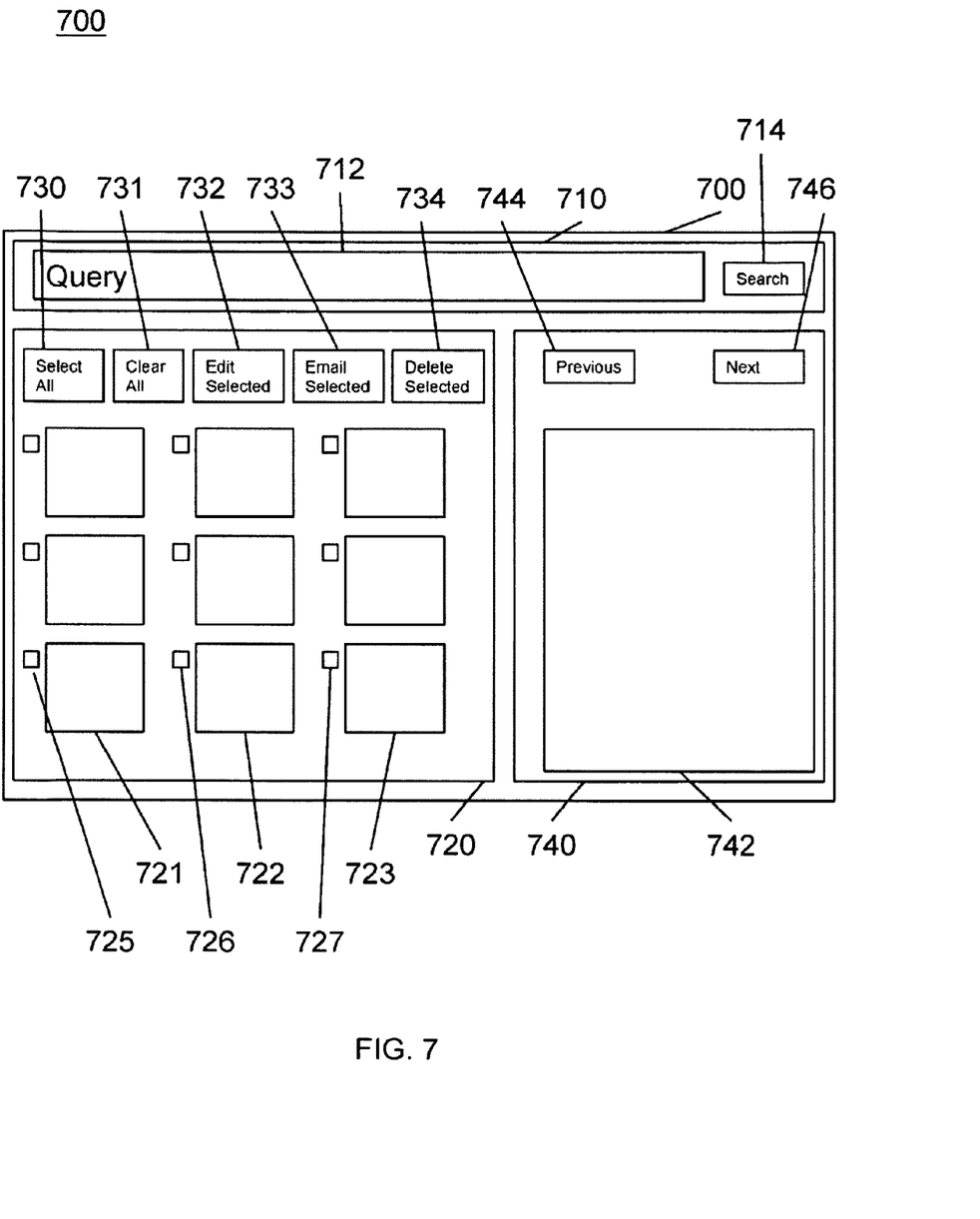
FIG. 7 is a diagram of an interface for searching for images corresponding to certain attributes and manipulating those images in accordance with some embodiments.

After faces have been automatically assigned attributes and stored in a database as described above in connection with FIGS. 1-5, a user can search for these faces and perform actions on them using any suitable interface. An example of a user interface 700 for searching for faces is shown in FIG. 7. As illustrated, interface 700 includes a query window 710, a results window 720, and a preview window 740. In operation, after a user enters query terms into a query field 712 and clicks on a search button 714, results window 720 can be populated with one or more faces 721-723 having the attributes corresponding to the query terms. The faces can be presented in ranked order according to the probability or confidence value (e.g., output from an SVM classifier) that the corresponding face corresponds to one or more attributes associated with the one or more query terms. Where multiple attributes correspond to multiple terms in a query used, the probability of a face corresponding to the attributes can be defined as the product of the probabilities of the face corresponding to each individual attribute. The user can then select one or more of the faces using check boxes 725-727 corresponding to the faces. The user can also select all of the faces using button 730, clear all of the selections using button 731, edit the images corresponding the selected faces using button 732, email the images corresponding to the selected faces using button 733, and/or delete the images corresponding to the selected faces using button 734. When a mouse pointer is hovered over a face, or a face selected using one of boxes 725-727, a preview of the image corresponding to the selected face can be presented in frame 742. The user can then select other images to preview based on the selected faces by clicking on previous button 744 and next button 746.

In some embodiments, any suitable mechanism can be used to associate one or more query terms with one or more attributes. For example, a "dictionary" which maps user terms to attributes can be used. As a more particular example, multiple terms, such as "man," "male," "not female," along with many others, can all be mapped to a single attribute, such as "gender=male." A term can also be mapped to multiple attributes in this way. For example, "boy" can be mapped to "gender=male AND age=child." Additionally or alternatively, as another example, natural language processing (NLP) techniques can be used to associate query terms and attributes.

Figure 11:
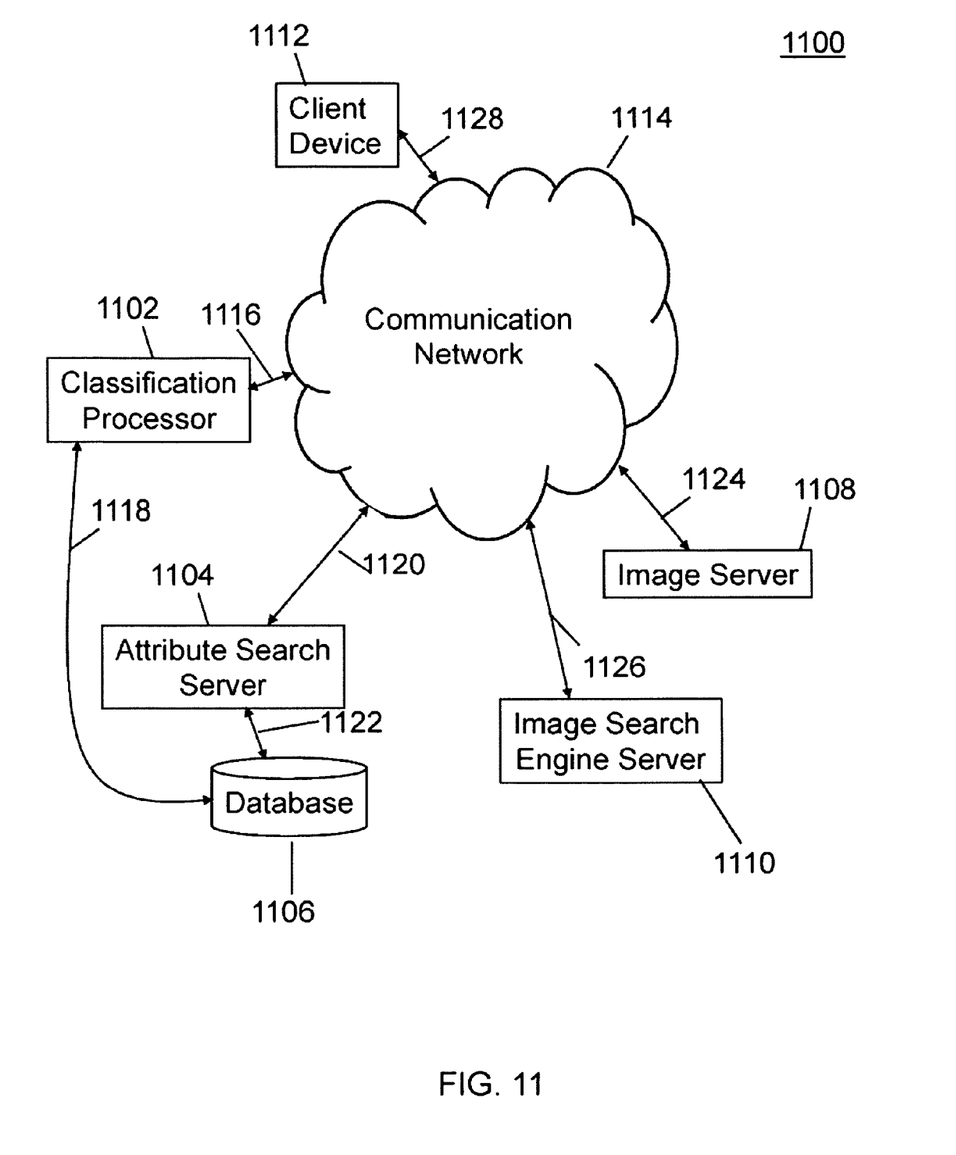
FIG. 11 is a diagram of hardware that can be used in systems for automatically classifying face images in accordance with some embodiments.

FIG. 11 illustrates hardware 1100 that can be used to implement face classifying mechanisms as described herein in accordance with some embodiments. As shown, hardware 1100 includes a classification processor 1102, an attribute search server 1104, a database 1106, an image server 1108, an image search engine server 1110, a client device 1112, a communication network 1114, and connections 1116, 1118, 1120, 1122, 1124, 1126, and 1128. Classification processor 1102 can be any suitable device for automatically assigning attributes to faces and for creating training/testing faces as described above. Attribute search server can be any suitable device for enabling a user to search for faces based on attributes and manipulate the images containing those faces as described above. Database 1106 can be any suitable storage device for storing faces, images, face data, attributes associated with the faces, and confidence values associated with the attributes as described above, such as memory, a disk drive, a network drive, a database, a server, etc. Image server 1108 can be any suitable device for storing and making accessible images publicly (e.g., when implemented as a Web site server) and/or privately (e.g., when implemented as a personal media server). Image search engine server 1110 can be any suitable device for searching for and presenting images publicly (e.g., when implemented as a Web site search engine) and/or privately (e.g., when implemented as a personal media search engine). Client device 1112 can be any suitable device for accessing and/or interfacing with classification processor 1102, attribute search server 1104, image server 1108, and/or image search engine server 1110.

More particularly, for example, each of processor 1102, server 1104, server 1108, server 1110, and device 1112 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client device 1112 can be implemented as a personal computer, a personal data assistant (PDA), a portable email device, a multimedia terminal, a mobile telephone, a set-top box, a television, etc.

Communication network 1114 can be any suitable communication network, such as the Internet, a local area network (LAN), a wide area network (WAN), a wired network, a wireless network, a telephone network, a cable television network, a satellite network, any combination of the same, etc. Connections 1116, 1118, 1120, 1122, 1124, 1126, and 1128 can be any suitable connections for connecting the other devices illustrated in FIG. 11. For example, these connections can be wired connections, wireless connections, any combination of the same, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for automatically classifying a face image, comprising:
   selecting at least two features of the face image to be classified for an attribute of face images of different faces, wherein each of the two features corresponds to a different region of the face image and specifies at least one of a type of pixel data to be evaluated for the region, a normalization to be applied for the region, and an aggregation to be applied for the region;
   classifying the face image with respect to the attribute based on the at least two features of the image;
   assigning the attribute and a confidence value to the face image based on the classifying;
   receiving a query from a user;
   identifying the attribute as corresponding to the query;
   determining that the face image corresponds to the attribute; and
   identifying to the user the face image as corresponding to the query.

2. The method of claim 1, wherein one of the at least two features specifies a type of pixel data to be evaluated for the region.

3. The method of claim 1, wherein one of the at least two features specifies a normalization to be applied for the region.

4. The method of claim 1, wherein one of the at least two features specifies an aggregation to be applied for the region.

5. The method of claim 1, wherein selecting the at least two features comprises performing an Adaboost process.

6. The method of claim 1, wherein selecting the at least two features comprises:
   a) defining an empty set of classifiers;
   b) setting each of a plurality of pre-classified faces to have an equal weighting;
   c) classifying the plurality of pre-classified faces using at least two single-feature classifiers not included in the set of classifiers to determine the weighted accuracy of each of the at least two single-feature classifiers;
   d) adding the single-feature classifier that has the best weighted accuracy and that is not already in the set of classifiers to the set of classifiers along with a weight that depends on the weighted accuracy of the single-feature classifier;
   e) re-weighting each of the plurality of pre-classified faces based on whether the pre-classified face was correctly classified using the single-feature classifier added in (c);
   f) repeating (c) through (e); and
   g) selecting, as the at least two features, the features corresponding to the single-feature classifiers in the set of classifiers.

7. The method of claim 6, wherein the classifying the face image with respect to the attribute based on the at least two features of the image is performed using a multi-feature classifier based on the at least two features.

8. The method of claim 6, wherein the classifying the face image with respect to the attribute based on the at least two features of the image is performed using a weighted combination of the single-feature classifiers in the set of classifiers.

9. The method of claim 1, wherein selecting the at least two features comprises:
   a) defining an empty set of features;
   b) training a separate classifier for each a plurality of features not in the set of features using the set of features and a different one of the plurality of features not in the set of features, and noting the training accuracy for each separate classifier noted;
   c) identifying the one of the plurality of features not in the set of features corresponding to the separate classifier with the best training accuracy in (b) and adding the one of the plurality of features identified to the set of features;
   d) repeating (b) and (c) in subsequent rounds until the best training accuracy in one round is not better by at least some predetermined amount than the best training accuracy from the previous round, or until a maximum number of rounds has occurred; and
   e) selecting, as the at least two features, the features corresponding to the separate classifier with the best training accuracy from the different rounds.

10. The method of claim 9, wherein the classifying the face image with respect to the attribute based on the at least two features of the image is performed using the separate classifier with the best training accuracy from the different rounds.

11. A system for automatically classifying a face image, comprising:
   at least one processor that:
      selects at least two features of the face image to be classified for an attribute of face images of different faces, wherein each of the two features corresponds to a different region of the face image and specifies at least one of a type of pixel data to be evaluated for the region, a normalization to be applied for the region, and an aggregation to be applied for the region;
      classifies the face image with respect to the attribute based on the at least two features of the image;
      assigns the attribute and a confidence value to the face image based on the classifying;
      receives a query from a user;
      identifies the attribute as corresponding to the query;

determines that the face image corresponds to the attribute; and identifies to the user the face image as corresponding to the query.

12. The system of claim 11, wherein one of the at least two features specifies a type of pixel data to be evaluated for the region.

13. The system of claim 11, wherein one of the at least two features specifies a normalization to be applied for the region.

14. The system of claim 11, wherein one of the at least two features specifies an aggregation to be applied for the region.

15. The system of claim 11, wherein, in selecting the at least two features, the at least one processor also performs an Adaboost process.

16. The system of claim 11, wherein in selecting the at least two features, the at least one processor also:
a) defines an empty set of classifiers;
b) sets each of a plurality of pre-classified faces to have an equal weighting;
c) classifies the plurality of pre-classified faces using at least two single-feature classifiers not included in the set of classifiers to determine the weighted accuracy of each of the at least two single-feature classifiers;
d) adds the single-feature classifier that has the best weighted accuracy and that is not already in the set of classifiers to the set of classifiers along with a weight that depends on the weighted accuracy of the single-feature classifier;
e) re-weights each of the plurality of pre-classified faces based on whether the pre-classified face was correctly classified using the single-feature classifier added in (c);
f) repeats (c) through (e); and
g) selects, as the at least two features, the features corresponding to the single-feature classifiers in the set of classifiers.

17. The system of claim 16, wherein, in classifying the face image with respect to the attribute based on the at least two features of the image, the at least one processor uses a multi-feature classifier based on the at least two features.

18. The system of claim 16, wherein, in classifying the face image with respect to the attribute based on the at least two features of the image, the at least one processor uses a weighted combination of the single-feature classifiers in the set of classifiers.

19. The system of claim 11, wherein, in selecting the at least two features, the at least one processor also:

a) defines an empty set of features;
b) trains a separate classifier for each a plurality of features not in the set of features using the set of features and a different one of the plurality of features not in the set of features, and notes the training accuracy for each separate classifier noted;
c) identifies the one of the plurality of features not in the set of features corresponding to the separate classifier with the best training accuracy in (b) and adds the one of the plurality of features identified to the set of features;
d) repeats (b) and (c) in subsequent rounds until the best training accuracy in one round is not better by at least some predetermined amount than the best training accuracy from the previous round, or until a maximum number of rounds has occurred; and
e) selects, as the at least two features, the features corresponding to the separate classifier with the best training accuracy from the different rounds.

20. The system of claim 19, wherein, in classifying the face image with respect to the attribute based on the at least two features of the image, the at least one processor uses the separate classifier with the best training accuracy from the different rounds.

21. A non-transitory computer-readable medium containing computer-executable instructions that, when executed by a processor, cause the processor to perform a method for automatically classifying a face image, the method comprising:

selecting at least two features of the face image to be classified for an attribute of face images of different faces, wherein each of the two features corresponds to a different region of the face image and specifies at least one of a type of pixel data to be evaluated for the region, a normalization to be applied for the region, and an aggregation to be applied for the region;

classifying the face image with respect to the attribute based on the at least two features of the image;

assigning the attribute and a confidence value to the face image based on the classifying;

receiving a query from a user;

identifying the attribute as corresponding to the query;

determining that the face image corresponds to the attribute; and identifying to the user the face image as corresponding to the query.

* * * * *